United States Patent [19]

Portegies et al.

[11] Patent Number: 5,789,830
[45] Date of Patent: Aug. 4, 1998

[54] IN-LINE ROTATIONAL DRIVE

[75] Inventors: Hans Portegies, Temecula; Chia Chen, Fullerton; Edward A. Neff, Rancho Santa Fe, all of Calif.

[73] Assignee: Systems, Machines, Automation Components Corporation, Carlsbad, Calif.

[21] Appl. No.: 889,417

[22] Filed: Jul. 8, 1997

[51] Int. Cl.[6] ................................. H02K 41/00
[52] U.S. Cl. ..................... 310/12; 310/17; 29/739; 29/834
[58] Field of Search ................. 310/12, 13, 14, 310/15, 17, 80; 318/115; 29/739, 740, 741, 743, 744, 834

[56] References Cited

U.S. PATENT DOCUMENTS

| | | | |
|---|---|---|---|
| 4,498,023 | 2/1985 | Stout | 310/14 |
| 4,510,683 | 4/1985 | Fedde et al. | 29/701 |
| 4,653,794 | 3/1987 | Atlas | 294/88 |
| 4,759,124 | 7/1988 | Snyder et al. | 29/834 |
| 4,864,880 | 9/1989 | Grant et al. | 74/110 |
| 4,913,613 | 4/1990 | Hirschmann | 414/751 |
| 5,055,725 | 10/1991 | LaSota | 310/14 |
| 5,175,456 | 12/1992 | Neff et al. | 310/13 |
| 5,285,142 | 2/1994 | Galburt et al. | 318/640 |
| 5,291,662 | 3/1994 | Matsumiya et al. | 33/503 |
| 5,315,189 | 5/1994 | Neff et al. | 310/12 |
| 5,317,222 | 5/1994 | Neff et al. | 310/13 |
| 5,341,751 | 8/1994 | Cuneo et al. | 108/143 |
| 5,446,323 | 8/1995 | Neff et al. | 310/12 |

*Primary Examiner*—Thomas M. Dougherty
*Assistant Examiner*—Judson H. Jones
*Attorney, Agent, or Firm*—Nydegger & Associates

[57] ABSTRACT

An in-line linear/rotary drive mechanism for a voice coil actuator includes an electro-magnetic drive motor having a rotatable drive shaft. Specifically, both the drive motor and its rotatable shaft are slidably mounted for translational movement on the housing of the actuator. An actuator probe is also slidably mounted on the actuator housing. Importantly, a bearing unit constrains the actuator probe to translational movement along a predetermined axis on the actuator housing. Further, a rotary-servo coupling selectively connects the rotatable drive shaft of the electro-magnetic drive motor with the actuator probe. Within this combination, the actuator probe moves in direct translation with the drive motor along the predetermined axis. Also, within this combination the actuator probe moves in rotation about the predetermined axis in response to the rotatable drive shaft.

20 Claims, 1 Drawing Sheet

IN-LINE ROTATIONAL DRIVE

FIELD OF THE INVENTION

The present invention pertains to machinery which is typically used in he assembly operation of a product manufacturing process. More particularly, the present invention pertains to actuator probes which are useful for the precision placement of a product component during assembly of the product. The present invention is particularly, but not exclusively, useful as a tool for precisely and accurately orienting an assembly component through both translational and rotational movements of the component.

BACKGROUND OF THE INVENTION

For many manufacturing assembly operations it is very important that a particular component or sub-assembly of the final product be positioned with great precision and extreme accuracy during product assembly. It is significant that this positioning operation frequently requires that the component or sub-assembly be properly oriented through both translational and rotational movement of the component. Further, in addition to being spatially oriented, the interactive forces which are generated during product assembly between the component or sub-assembly and other parts of the final product must often be controlled within specified limits. On top of all this, it is important that the assembly operation be accomplished with sufficient speed to make the operation economically feasible.

Several actuators have been proposed for the accurate and precise placement of component and sub-assembly parts during a manufacturing process. For example, U.S. Pat. No. 5,175,456 which issued to Neff et al. for an invention entitled "Workpiece Transporter" and which is assigned to the assignee of the present invention discloses a linear voice coil actuator which provides precise and effective control over the movement of an actuator in translation. Further, U.S. Pat. No. 5,315,189 which issued to Neff et al. for an invention entitled "Actuator with Translational and Rotational Control" discloses a mechanism which provides for both translational and rotational control of an actuator probe.

In all linear-rotary drive mechanisms, there is a concern for the precision, accuracy, and speed which can be attained during the operation of the mechanism. This is particularly so for the rotational capability of a linear-rotary drive mechanism which must be repetitively operated at great speeds.

Typically, a linear-rotary drive mechanism employs two independently operable motors. For such mechanisms, one motor is used to drive and position the actuator probe in translation, while a second motor is used to drive and position the actuator probe in rotation. To reduce the weight of moveable components and to thereby increase the speed and response of the actuator probe, the motors are usually not mounted for direct movement with the actuator probe. Instead, they are mounted eccentrically and, thus, are off-set from the axis of the actuator probe. For several reasons, this offset reduces the rotational accuracy of the actuator probe.

With an off-set rotary drive shaft motor, an actuator probe which is to be driven in rotation by the motor will necessarily be subjected to uneven lateral components of the rotational drive forces. Specifically, for rotary motors which use gear drives, the lateral forces which are generated at the gears will be applied to the rotatable actuator probe at one or more points on the surface of the probe. For rotary drive motors which use drive belts, the lateral forces will be applied along a circumferential portion of the actuator probe.

2

In either case, if left unchecked, these uneven lateral forces will tend to cause wobble of the actuator probe during its operation. Further, it is well known that gears and drive belts wear out and get sloppy. Thus, as they are used, gears and drive belts become susceptible to increasingly aggravated positional errors. Over time these positional errors can become unacceptable.

In light of the above, it is an object of the present invention to provide an in-line linear/rotary drive mechanism which has a bearing unit that constrains a rotatable actuator probe to translation along a predetermined axis. Another object of the present invention is to provide an in-line linear/rotary drive mechanism which moves a direct rotational drive motor in coaxial alignment with the actuator probe to minimize uneven lateral forces on the actuator probe which cause it to wobble. Yet another object of the present invention is to provide an in-line linear/rotary drive mechanism which is capable of rotating a 2 ounce actuator probe through 90° in 50 msec with a rotational accuracy of ±0.01°. Still another object of the present invention is to provide an in-line linear/rotary mechanism which uses neither gears nor drive belts in order to minimize or eliminate slippage and wobble during the rotation of the actuator probe. It is yet another object of the present invention to provide an in-line linear/rotary mechanism which is simple to use, relatively easy to manufacture, and comparatively cost effective.

SUMMARY OF THE PREFERRED EMBODIMENTS

An in-line linear/rotary drive mechanism, in accordance with the present invention, includes a linear voice coil, and a rotary motor with a rotational drive shaft. Both the rotary motor and its rotational drive shaft are mounted on the linear voice coil for translational movement therewith. Additionally, the mechanism of the present invention includes an actuator probe which is connected to the rotational drive shaft of the rotary motor. Within this combination the actuator probe moves in translation along with the rotational drive shaft in response to movements of the linear voice coil. Superposed on this translational motion, the actuator probe moves in rotation in response to rotations of the drive shaft. As intended for the present invention, the actuator probe is substantially connected in coaxial alignment with the rotational drive shaft so that both rotational and translational forces are directly imparted to the actuator probe relative to the same axis.

Within the combination stated above, linear or translational movement of the actuator probe results from the operation of the linear voice coil. Specifically, the linear voice coil includes a permanent magnet which is fixedly attached to the mechanism's housing. The voice coil also includes an electrical coil which surrounds the magnet and which is slidingly mounted on the housing. Accordingly, whenever a current is passed through the coil, an electromagnetic field is generated which interacts with the magnetic field of the permanent magnet. The resultant force then moves the coil in translation relative to the housing. The rotational drive shaft and the actuator probe move with the coil.

Translational movement of the actuator probe is refined for the present invention by the incorporation of a bearing unit which is attached to the housing. In more detail, this bearing unit includes two bearing assemblies which are linearly distanced from each other on the housing. The actuator probe is held by both bearing assemblies and, as such, is effectively constrained for translation along only the longitudinal axis of the actuator probe. As intended for the present invention, this constraint reduces wobble in the actuator probe.

It is an important aspect of the present invention that the rotational drive shaft of the drive motor is connected directly in-line with the actuator probe. Stated differently, the rotational drive shaft is connected in coaxial alignment with the actuator probe. Thus, the motor and the rotational drive shaft substantially move in-line with the actuator probe. In order to establish this combination of structure, the connection between the rotational drive shaft and the actuator probe is preferably a rotary-servo coupling. As recognized by the present invention, a helical spring-type device is one kind of rotary-servo coupling which is capable of transferring both translational and rotational forces from the drive shaft to the actuator probe. Importantly, and regardless of the type of rotary-servo coupling that is used, the connection here needs to be made without also transferring uneven lateral side forces to the actuator probe which could aggravate its wobble.

In the operation of the in-line linear/rotary drive mechanism of the present invention, translational movement of the actuator probe is caused by the action of the linear voice coil. Importantly, as indicated above, this translational movement also results in the translational movement of the rotary drive motor. Superposed on this translation movement, a rotation of the actuator probe is caused by the rotary drive motor. It will be appreciated by the skilled artisan that the translational and rotational movements of the actuator probe can be accomplished simultaneously or independently.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
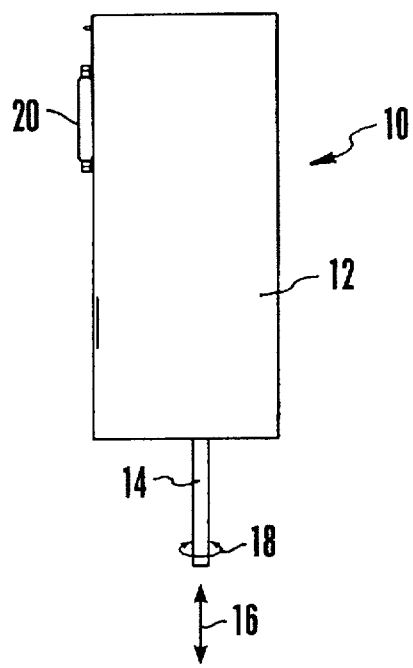
FIG. 1 is a side elevational view of an actuator according to the present invention.

Referring initially to FIG. 1, a linear/rotary actuator in accordance with the present invention is shown and is generally designated 10. As shown in FIG. 1, the actuator 10 includes a housing 12 and an actuator probe 14 which extends from the housing 12. For purposes of the present invention, it is intended that the probe 14 of actuator 10 be moved with extreme precision and great speed. These movements include translation (as indicated by the translation arrow 16), and rotation (as indicated by the rotation arrow 18). Due to the combination of components provided by the present invention, rotational accuracy for the probe 14 is on the order of approximately one-one hundredth of a degree (±0.010); translational accuracy for the probe 14 are comparable; and both rotational and translational movements of the probe 14 can be accomplished in msec. For example, it is contemplated that the probe 14 can be rotated 90° in approximately 50 msec. To achieve the high speed movements both the translational and rotational movements of the probe 14 are done electronically. Therefore, an electrical connector 20 is provided to supply electrical power to the actuator 10.

Figure 2:
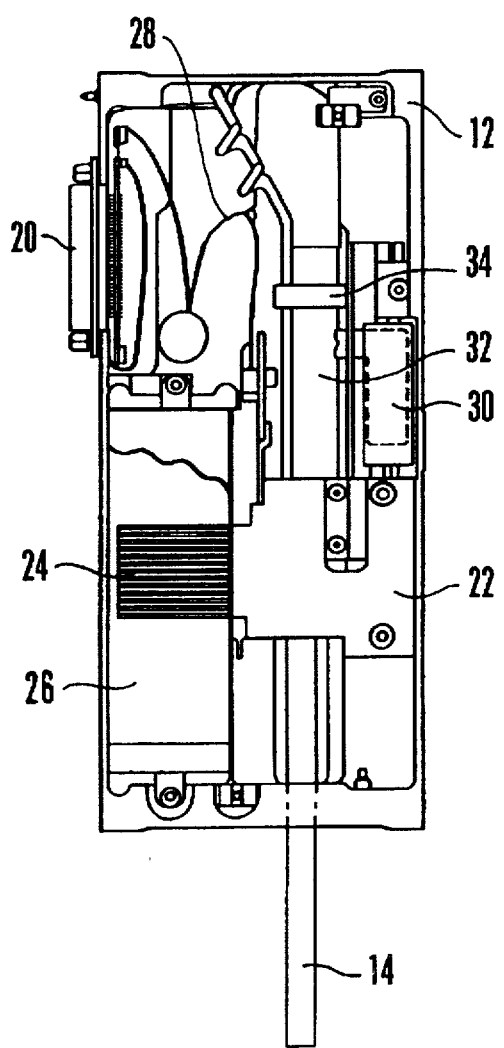
FIG. 2 is a side elevational view of the actuator shown in FIG. 1 with a side panel of the actuator removed for viewing the interior of the actuator.

Inside of the actuator 10, as best seen in FIG. 2, a piston 22 is slidingly mounted on the housing 12. As so mounted, the piston 22 is able to reciprocate in translation on the housing 12 in directions generally indicated by the translation arrow 16 in FIG. 1. It will be appreciated with further reference to FIG. 2, that an electrical coil is fixedly attached to the piston 22 for reciprocal movement therewith. Additionally, it is to be appreciated that a magnet 26 is fixedly mounted on the housing 12. A flexible electrical harness 28 is also provided to electrically connect the coil 24 with the electrical connector 20 so that a current can be passed through the coil 24. As will be appreciated by the skilled artisan, as a current is passed through the coil 24, an electromagnetic field will be created by the coil 24 which will interact with the magnetic field of the magnet 26. As is well known, the interaction between the electromagnetic field of the coil 24 and the magnetic field of the magnet 26 will create a force which tends to move the coil 24 relative to the magnet 26 and the housing 12. More specifically, depending on the direction of current through the coil 24, this interaction between the respective magnetic fields will move the piston 22 in reciprocal translational motion in the direction of arrow 16.

Still referring to FIG. 2, it will be seen that a linear encoder 30 is attached to the piston 22. In a manner well known in the pertinent art, a portion of the linear encoder 30 moves with the piston 22 and another portion of the linear encoder 30 remains stationary with the housing 12. By sensing the relative position of these respective portions of the encoder 30 the exact linear position of the piston 22, and hence the exact linear position of the probe 14 can be ascertained.

A very important aspect of the present invention is that the rotary motor 32 is mounted on the piston 22 for direct movement with the actuator probe 14. As shown in FIG. 2, this joint movement of the motor 32 and the actuator probe 14 results from the interaction between the electrical current activated coil 24, and the magnet 26. For purposes of the present invention, the rotary motor 32 is preferably gearless and is a brush type rotary motor. FIG. 2 also shows that a high resolution rotary encoder 34 is mounted on the rotary motor 32. For purposes of the present invention, the rotary encoder 34 should be of a type, which is commercially available, and which is capable of angular resolutions in the range of approximately ±0.0072°.

Figure 3:
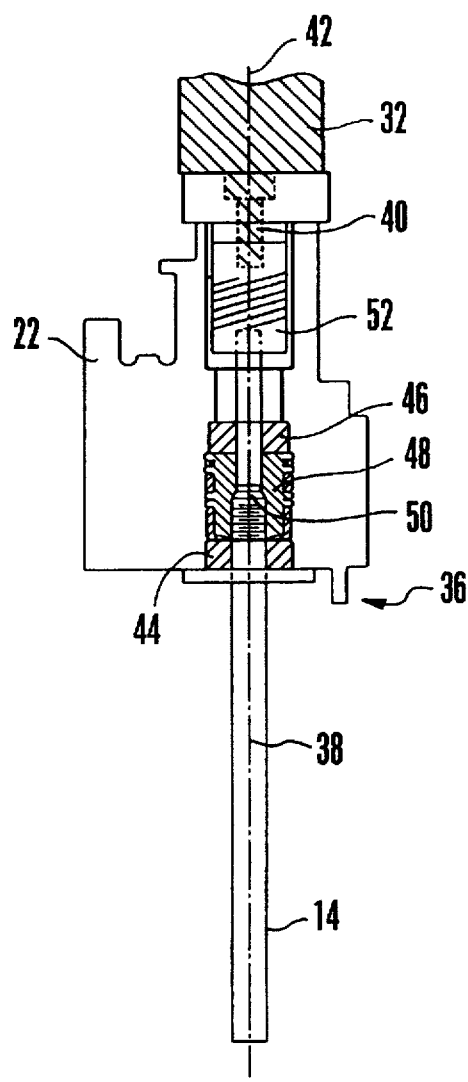
FIG. 3 is an elevational view of the in-line linear/rotary drive mechanism of the present invention with portions of the actuator removed to expose the drive mechanism, and with portions of the drive mechanism shown in cross-section for clarity.

In FIG. 3, the in-line linear/rotary drive mechanism of the present invention is shown and generally designated 36. In this mechanism 36 it is to be noted that both the actuator probe 14 and the rotary motor 32 are directly mounted on the piston 22. As so mounted, the actuator probe 14 defines a longitudinal axis 38, and the rotary motor 32 has a rotary drive shaft 40 which defines a rotary axis 42. Ideally, the longitudinal axis 38 is coaxial, or co-linear, with the rotary axis 42. With this coaxial cooperation, a rotation of rotary axis 42 does not transfer uneven lateral forces to the actuator probe 14 during rotation of the actuator probe 14. Further, it is very desirable that, relative to the housing 12, the longitudinal axis 38 of actuator probe 14 remain substantially fixed. This insures the probe 14 will move in pure translational movement along the axis 38. Accordingly, the cooperation of structure for the various components of drive mechanism 36 are intended to a) impart a pure rotation to the actuator probe 14 around the longitudinal axis 38 without generating uneven lateral or side forces, and b) impart a pure translation to the actuator probe 14 along the longitudinal axis 38. These movements, of course, are intended to be accomplished with great speed and extreme accuracy.

Translational movement of actuator probe 14 along the longitudinal axis 38 is facilitated by a bearing unit that is mounted on the piston 22. Specifically, this bearing unit includes a distal bearing assembly 44 and a proximal bearing assembly 46. As shown in FIG. 3, the proximal bearing assembly 46 is axially distanced from a proximal bearing assembly 46. Together, these bearing assemblies 44, 46 guide the actuator probe 14 in its translational movement along the longitudinal axis 38 on housing 12. Recall, the motive force for accomplishing this movement is generated by the interaction of the coil 24 with the magnet 26. Additionally, as also shown in FIG. 3, a chamber 48 can be established between the bearing assemblies 44, 46, and a suction port 50 can be formed into the actuator probe 14. Thus, with a suction device (not shown) connected with the chamber 48, a partial vacuum can be established through the port 50 and in a lumen (not shown) in the actuator probe 14. As will be appreciated by the skilled artisan, such a vacuum can be used through the probe 14 to assist in gripping parts or components that are to be moved by the actuator 10.

Rotational movement of the actuator probe 14 around the longitudinal axis 38 is caused by the rotary motor 42. Specifically, the rotary motor 42 can be of a type that is commercially available which is light weight and which will generate torques in the range between approximately one and two inchounces (1-2 in-oz). The actual transfer of rotational forces from the rotary drive shaft 40 of rotary motor 32 to the actuator probe 14 is accomplished by a rotary-servo coupling 52. Preferably, the rotary-servo coupling 52 is of a helical spring arrangement, such as shown in FIG. 3, so that rotational forces are evenly transferred tangentially to the probe 14. Additionally, it is to be appreciated that linear axial forces can be transferred through the coupling 52 with minimal change in the distance between the rotary drive shaft 40 and the actuator probe 14. Perhaps most importantly, the coupling 52 can transfer rotational forces to the actuator probe 14 while accommodating slight misalignments between the rotary axis 42 and the longitudinal axis 38. This can be done without generating side loads on the actuator probe 14 which will cause wobble and thereby disrupt the accuracies to be attained. For purposes of the present invention, the coupling 52 can be selectively engaged and disengaged with wither the rotary drive shaft 40 or the actuator probe 14. These connections with the coupling 52 can be accomplished in any way known in the pertinent art, such as screws.

While the particular in-line rotational drive as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An in-line linear/rotary drive mechanism which comprises:

a housing;

an actuator probe mounted on said housing for translational and rotational movement respectively along and around a predetermined axis relative to said housing;

a bearing unit mounted on said housing and engaged with said actuator probe to constrain translational movement of said actuator probe along said predetermined axis;

an electromagnetic drive means mounted on said housing for translational movement with said probe along said predetermined axis; and a rotary-servo coupling interconnecting said drive means in-line with said actuator probe for transferring translational and rotational forces from said drive means to said actuator probe.

2. A mechanism as recited in claim 1 wherein said bearing unit comprises:

a first bearing assembly mounted on said housing; and a second bearing assembly mounted on said housing, said second bearing assembly being distanced from said first bearing assembly along said predetermined axis to provide translational stability for said actuator probe.

3. A mechanism as recited in claim 1 wherein said electro-magnetic drive means comprises:

a magnet for generating a magnetic field, said magnetic field being fixedly mounted on said housing;

an electrical coil for generating an electro-magnetic field, said electrical coil being slidably mounted on said housing with said electro-magnetic field interactive with said magnetic field to generate a force for moving said coil relative to said housing; and a motor having a rotatable drive shaft, said motor being mounted on said coil for translational movement therewith and having said rotatable drive shaft interconnected with said actuator probe through said rotary-servo coupling.

4. A mechanism as recited in claim 3 wherein said rotatable drive shaft is in substantial coaxial alignment with said actuator probe.

5. A mechanism as recited in claim 3 wherein said rotary-servo coupling has a helical configuration and is selectively connectable with said actuator probe and said rotatable drive shaft.

6. A mechanism as recited in claim 1 wherein said drive means rotates said actuator probe approximately 90° in 50 msec.

7. A mechanism as recited in claim 1 wherein said actuator probe weighs approximately 2 oz.

8. A mechanism as recited in claim 1 wherein said drive mechanism rotates said actuator probe through a rotation with an accuracy of approximately ±0.01° accuracy.

9. A mechanism as recited in claim 1 wherein said drive means imparts to said actuator probe a rotational force of approximately 1-2 in-oz.

10. An in-line linear/rotary drive mechanism which comprises:

a housing;

a motor having a rotatable drive shaft, said motor being mounted on said housing;

a first bearing assembly mounted on said housing;

a second bearing assembly mounted on said housing;

an actuator probe defining an axis, said actuator probe being mounted on said housing and engaged with said first and said second bearing assemblies to position said actuator probe in substantial coaxial alignment with said drive shaft, said actuator probe being mounted for rotation about said axis and constrained in translation along said axis by said first and second bearing assemblies; and a coupling interconnecting said drive shaft in-line with said actuator probe for transferring axial rotational and axial translational forces therebetween while substantially eliminating radial forces therebetween.

11. A mechanism as recited in claim 10 further comprising:

an electrical coil for generating an electrical field, said electrical coil being slidably mounted on said housing;

a magnet fixedly mounted on said housing for generating a magnetic field, said magnetic field being interactive with said electrical field to generate a force for moving said coil in translation relative to said housing; and means for mounting said motor with said rotatable drive shaft on said coil for translational movement therewith.

12. A mechanism as recited in claim 10 wherein said first bearing assembly is distanced from said second bearing assembly along said axis to provide translational stability for said actuator probe.

13. A mechanism as recited in claim 10 wherein said coupling is a helical connector, and said helical connector is selectively connected with said actuator probe and integrally connected with said drive shaft.

14. A mechanism as recited in claim 10 wherein said motor rotates said actuator probe approximately 90° in 50 msec.

15. A mechanism as recited in claim 10 wherein said actuator probe weighs approximately 2 oz.

16. A mechanism as recited in claim 10 wherein said motor rotates said actuator probe through a rotation with an accuracy of approximately ±0.01° accuracy.

17. A mechanism as recited in claim 10 wherein said motor imparts to said actuator probe a rotational force of approximately 1–2 in-oz.

18. A method for translating and rotating an actuator probe relative to a predetermined axis which comprises the steps of:

mounting the actuator probe on a bearing unit attached to a housing, the bearing unit having a first assembly and a second assembly respectively attached to the housing and distanced from each other to constrain translational and rotational movements of the actuator probe along and around the predetermined axis relative to the housing;

positioning an electromagnetic drive motor with a rotatable drive shaft on the housing for translational movement relative thereto along the predetermined axis;

selectively attaching a rotary-servo coupling between the actuator probe and the rotatable drive shaft of the drive motor for transferring axial rotational forces from the rotatable drive shaft to the actuator probe, and for transferring axial translational forces from the drive motor to the actuator probe; and activating said drive motor to move the actuator probe in translation and rotation.

19. A method as recited in claim 18 wherein said positioning step further comprises the steps of:

fixedly attaching a magnet to the housing to generate a magnetic field;

slidably mounting an electrical coil on the housing to generate an electrical field, the electrical field of the coil being interactive with the magnetic field of the magnet to establish a force for moving the coil relative to the housing; and affixing the drive motor with rotatable drive shaft to the coil for translational movement therewith.

20. A method as recited in claim 18 wherein said actuator probe weighs approximately 2 ounces, and wherein said activating step accomplishes a rotation of said actuator probe through approximately 90° in 50 msec with an accuracy of approximately ±0.01°, while using a rotational force of approximately 1–2 in-oz.

* * * * *